(12) United States Patent
Kashiwagi

(10) Patent No.: US 9,966,727 B2
(45) Date of Patent: May 8, 2018

(54) FIBER LASER SYSTEM

(71) Applicant: FUJIKURA LTD., Tokyo (JP)

(72) Inventor: Masahiro Kashiwagi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days. days.

(21) Appl. No.: 15/450,988

(22) Filed: Mar. 6, 2017

(65) Prior Publication Data

US 2017/0179678 A1 Jun. 22, 2017

Related U.S. Application Data

(63) Continuation of application No. PCT/JP2016/081722, filed on Oct. 26, 2016.

(30) Foreign Application Priority Data

Oct. 30, 2015 (JP) ................... 2015-214486

(51) Int. Cl.
*H01S 3/23* (2006.01)
*H01S 3/067* (2006.01)

(52) U.S. Cl.
CPC ............ *H01S 3/2391* (2013.01); *H01S 3/067* (2013.01)

(58) Field of Classification Search
CPC ................. H01S 3/2391; H01S 3/067
See application file for complete search history.

(56) References Cited

U.S. PATENT DOCUMENTS

| | | | |
|---|---|---|---|
| 6,212,310 B1 | 4/2001 | Waarts et al. | |
| 9,172,208 B1 * | 10/2015 | Dawson | ............... H01S 3/302 |
| 9,647,409 B2 * | 5/2017 | Guo | ............... H01S 3/067 |
| 2002/0097480 A1 | 7/2002 | Dominic et al. | |
| 2010/0046039 A1 | 2/2010 | Xie et al. | |
| 2014/0031649 A1 | 1/2014 | Nakao | |
| 2016/0254637 A1 | 9/2016 | Ikoma et al. | |

FOREIGN PATENT DOCUMENTS

| | | |
|---|---|---|
| JP | 11-230830 A | 8/1999 |
| JP | 2010-48805 A | 3/2010 |
| JP | 2014-18599 A | 2/2014 |
| JP | 2015-95641 A | 5/2015 |
| WO | 2012/165389 A1 | 12/2012 |
| WO | 2013/059681 A1 | 4/2013 |

OTHER PUBLICATIONS

Japanese Notice of Allowance dated Nov. 22, 2016, issued in counterpart Japanese Patent Application No. 2015-214486 (1 page).
International Search Report dated Oct. 1, 2017 issued in counterpart International Application No. PCT/JP2016/081722 (3 pages).
Search Report dated Nov. 27, 2017, issued in counterpart European Application No. 16840274.1 (7 pages).

* cited by examiner

*Primary Examiner* — Dung Nguyen
(74) *Attorney, Agent, or Firm* — Westerman, Hattori, Daniels & Adrian, LLP

(57) ABSTRACT

A fiber laser system enables an improved reflection resistance property. The fiber laser system includes fiber lasers (2 through 4) each having a laser medium which is an optical fiber made from silica glass. A difference between respective lasing wavelengths of any given two of the fiber lasers is greater than a wavelength equivalent to a half width at half maximum of a peak deriving from a vibration mode of a planar four-membered ring of a Si—O network structure of silica glass.

6 Claims, 2 Drawing Sheets

FIBER LASER SYSTEM

CROSS-REFERENCE TO RELATED APPLICATIONS

This application is a Continuation of PCT International Application No. PCT/JP2016/081722 filed in Japan on Oct. 26, 2016, which claims the benefit of Patent Application No. 2015-214486 filed in Japan on Oct. 30, 2015, the entire contents of which are hereby incorporated by reference.

TECHNICAL FIELD

The present invention relates to a fiber laser system including a plurality of fiber lasers.

BACKGROUND ART

In recent years, fiber laser systems including (i) a plurality of fiber lasers, (ii) an output combiner for combining laser light outputted by each of the plurality of fiber lasers, and (iii) a output section for outputting laser light from the output combiner to outside the laser system (for example, toward a processing target object) have been attracting attention as a way to achieve an output power of several kW (kilowatts). Light outputted by each of the plurality of fiber lasers propagates through a single-mode fiber or a quasi-single-mode fiber to the output combiner. Light outputted by the output combiner propagates through a multi-mode fiber to the output section. Such a fiber laser system is used mainly in the field of material processing.

With the above fiber laser system, there is a risk that light reflected by the processing target object will be reflected back to the fiber laser system and cause a malfunction thereof.

A reason for such malfunctioning of the fiber laser system is the occurrence of stimulated Raman scattering (hereinafter also referred to as "SRS") in a passage through which laser light propagates in the fiber laser system. SRS can be considered a process of power conversion from laser light to Stokes light. It is known that an increase in the conversion efficiency (Raman gain) thereof corresponds to a greater likelihood of the occurrence of Stokes light vibration. As a result, laser light generation in each fiber laser becomes unstable, and malfunctions can therefore occur in each fiber laser (see Patent Literature 1).

CITATION LIST

Patent Literature

[Patent Literature 1]
Japanese Patent Application Publication Tokukai No. 2015-95641 (Publication date: May 18, 2015)

SUMMARY OF INVENTION

Technical Problem

Conventionally, it has been presumed that in a fiber laser system, with respect to each of the fiber lasers, SRS originating from laser light outputted therefrom is an independently occurring phenomenon. As such, in order to prevent Stokes light vibration in a fiber laser system, consideration has only been given to solutions involving preventing SRS originating from the respective laser light outputted from each individual fiber laser.

The inventors of the present invention, however, found that the power of Stokes light generated in a fiber laser system is greater than the sum of the power of Stokes light occurring in each constituent fiber laser of the fiber laser system.

FIG. 4 is a graph comparing, at various wavelengths, (i) a value equivalent to three times the power of Stokes light generated in a fiber laser whose output power is 1 kW and (ii) the power of Stokes light generated by a fiber laser system having three (3) fiber lasers each of whose output power is 1 kW. The graph of FIG. 4 shows that the power of Stokes light occurring in a fiber laser system is greater than the sum of the power of Stokes light occurring in each constituent fiber laser of the fiber laser system. This fact suggests that, with respect to each of the fiber lasers, the SRS originating from laser light outputted therefrom is not an independently occurring phenomenon.

The following description will discuss this point in more detail, using an example of a fiber laser system including three (3) fiber lasers. First, assume a case where only a first fiber laser of the fiber laser system is operated. In such a case, in each part of the fiber laser system, the following relation holds true with regards to (i) laser light power PL1, (ii) Stokes light power PS1, and (iii) power dP1/dz converted from laser light to Stokes light:

$$dP1/dz = G \times PL1 \times PS1/\text{Aeff}$$

(where G represents a Raman gain coefficient, Aeff represents an effective cross-sectional area of light of an optical fiber, and z represents a lengthwise coordinate of the optical fiber). Next, assume a similar case where only a second fiber laser of the fiber laser system is operated. In this case as well, in each part of the fiber laser system, the following relation holds true with regards to (i) laser light power PL2, (ii) Stokes light power PS2, and (iii) power dP2/dz converted from laser light to Stokes light:

$$dP2/dz = G \times PL2 \times PS2/\text{Aeff}$$

Next, assume a similar case where only a third fiber laser of the fiber laser system is operated. In this case as well, in each part of the fiber laser system, the following relation holds true with regards to (i) laser light power PL3, (ii) Stokes light power PS3, and (iii) power dP3/dz converted from laser light to Stokes light:

$$dP3/dz = G \times PL3 \times PS3/\text{Aeff}$$

Assuming that, with respect to each of the fiber lasers, the SRS originating from laser light outputted therefrom were an independently occurring phenomenon, then it should be true that in a case where three (3) fiber lasers are operated, the power dP/dz converted from laser light to Stokes light in each part of the fiber laser system would match dP1/dz+dP2/dz+dP3/dz, i.e., the sum of power dP1/dz, dP2/dz, dP3/dz converted from laser light to Stokes light in the same part of the fiber laser system in a case where each of the fiber lasers is operated individually. Conversely, if it were assumed that, with respect to each of the fiber lasers, the SRS originating from laser light outputted therefrom were not an independently occurring phenomenon, then it should be true that in a case where three (3) fiber lasers are operated, the power dP/dz converted from laser light to Stokes light in each part of the fiber laser system would become:

$$dP/dz = G \times (PL1+PL2+PL3) \times (PS1+PS2+PS3)/\text{Aeff}$$

and thus be greater than the sum of power dP1/dz, dP2/dz, dP3/dz converted from laser light to Stokes light in the same part of the fiber laser system in a case where each of the fiber lasers is operated individually.

The experiment results shown in FIG. 4 suggest that the latter hypothesis is correct, i.e., that with respect to each of the fiber lasers, the SRS originating from laser light outputted therefrom is not an independently occurring phenomenon. In particular, note that light which enters the multi-mode fiber, which guides laser light combined by the output combiner to the output section, includes (i) laser light generated in each fiber laser, (ii) Stokes light generated in each fiber laser, and (iii) both laser light and Stokes light reflected by the processing target object. As such, it is considered that in this multi-mode fiber, conversion of power from laser light to Stokes light is expressed by:

$$dP/dz = G \times (PL1+PL2+PL3) \times (PS1+PS2+PS3)/Aeff$$

From the above observations, it is understood that, in a fiber laser system, with respect to each of the fiber lasers, the SRS originating from laser light outputted therefrom is not an independently occurring phenomenon. It is also understood that this non-independent nature of the SRS increases the efficiency of conversion of power from laser light to Stokes light and thus renders Stokes light vibration more likely to occur. As such, by altering the configuration of a fiber laser system so as to (i) increase the independence of SRS originating from laser light outputted by each fiber laser and (ii) decrease the efficiency of conversion of power from laser light to Stokes light, it is possible to achieve a fiber laser system in which Stokes light is less likely to be generated, in comparison to conventional techniques. That is, it is possible to achieve a fiber laser system which has a reflection resistance property superior to that of conventional techniques.

The present invention was made in view of the foregoing problem. An object of the present invention is to provide a fiber laser system having a reflection resistance property superior to that of conventional techniques.

Solution to Problem

In order to solve the above problem, a fiber laser system in accordance with an aspect of the present invention is a fiber laser system including: a plurality of fiber lasers, each having a laser medium which is an optical fiber made from silica glass; a combiner for combining laser light outputted by each of the plurality of fiber lasers; and an output fiber, made from silica glass, through which laser light combined by the combiner propagates as multi-mode light, a difference between respective lasing wavelengths of any given two of the plurality of fiber lasers being greater than a wavelength equivalent to a half width at half maximum of a peak deriving from a vibration mode of a planar four-membered ring of an Si—O network structure of silica glass.

Silica glass has an Si—O network structure, and a Raman spectrum thereof includes (i) a peak deriving from a vibration mode of a planar four-membered ring of the Si—O network structure (peak wavenumber in the vicinity of 490 $cm^{-1}$: Kayser) and (ii) a peak deriving from a vibration mode of skeletal vibration of the Si—O network structure (peak wavenumber in the vicinity of 440 $cm^{-1}$) (see Japanese Patent Application Publication, Tokukaihei, No. 11-230830).

With the above configuration, it is possible to ensure a sufficient difference between (i) the wavelength of laser light from a first fiber laser (a first fiber laser of any given two) and (ii) the wavelength of laser light from a second fiber laser (a second fiber laser of the any given two). It is also possible to ensure a sufficient difference between (i) a peak wavelength of Stokes light originating from the laser light from the first fiber laser (the peak deriving from the vibration mode of the planar four-membered ring) and (ii) a peak wavelength of Stokes light originating from the laser light from the second fiber laser (the peak deriving from the vibration mode of the planar four-membered ring).

This makes it possible to increase the independence of SRS originating from laser light outputted from each of the fiber lasers, thus making it possible to reduce the efficiency of conversion of power from laser light to Stokes light (Raman gain) which conversion is caused by SRS deriving from the vibration mode of the planar four-membered ring. As a result, it is possible to render Stokes light vibration less likely to occur. The above configuration therefore enables the fiber laser system to have a reflection resistance property superior to that of conventional techniques.

Advantageous Effects of Invention

An aspect of the present invention makes it possible to realize a fiber laser system having a reflection resistance property superior to that of conventional techniques.

DESCRIPTION OF EMBODIMENTS

Figure 1:
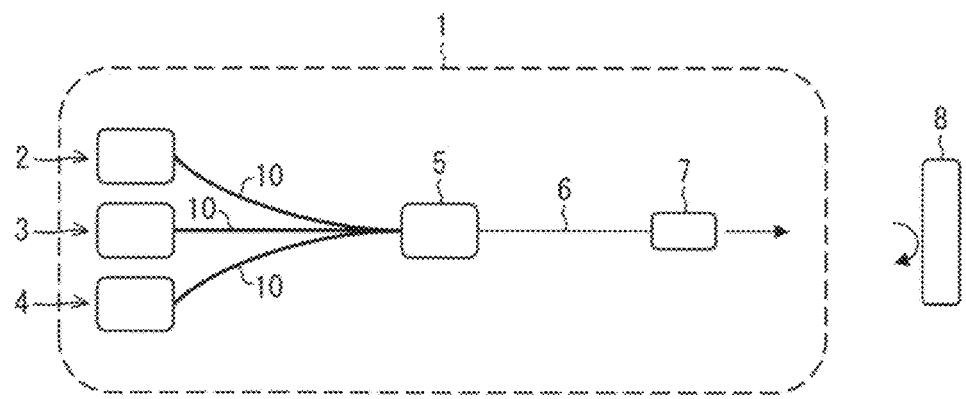
FIG. 1 schematically illustrates a configuration of a fiber laser system in accordance with an embodiment of the present invention.
Figure 2:
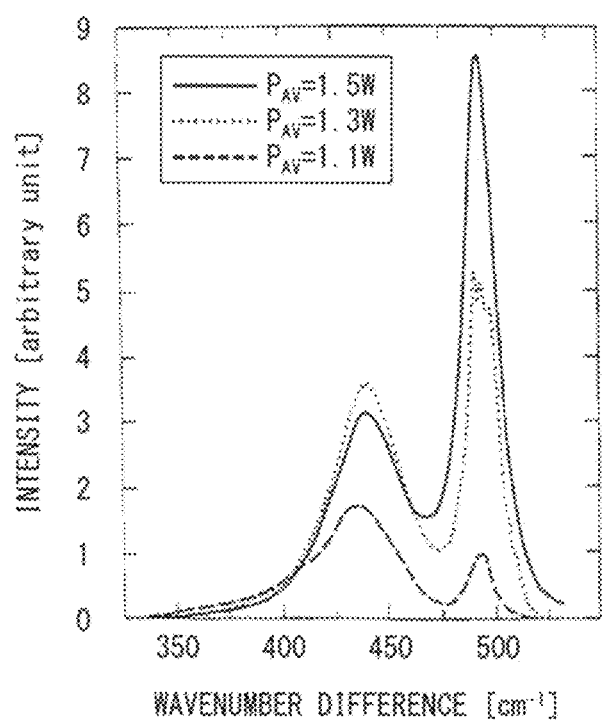
FIG. 2 is a graph showing a relation between (i) a wavenumber difference between laser light and Stokes light and (ii) an intensity of Stokes light, as seen in a case where laser light enters an optical fiber made of silica glass.
Figure 3:
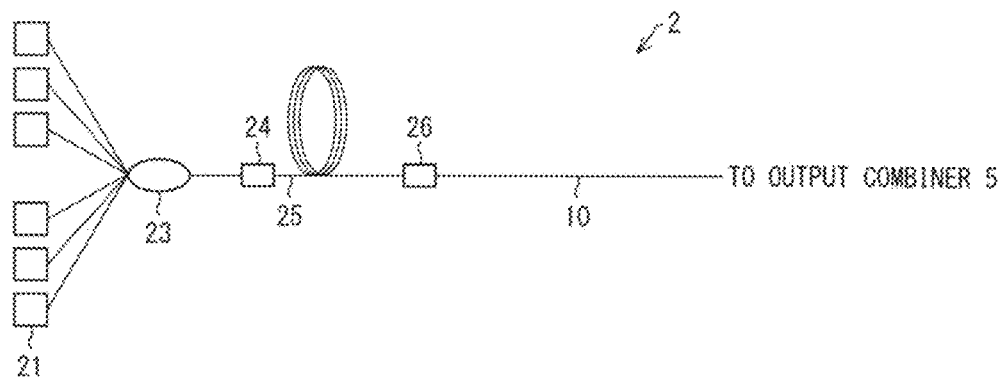
FIG. 3 is a diagram schematically illustrating a configuration of a fiber laser included in the fiber laser system of FIG. 1.
Figure 4:
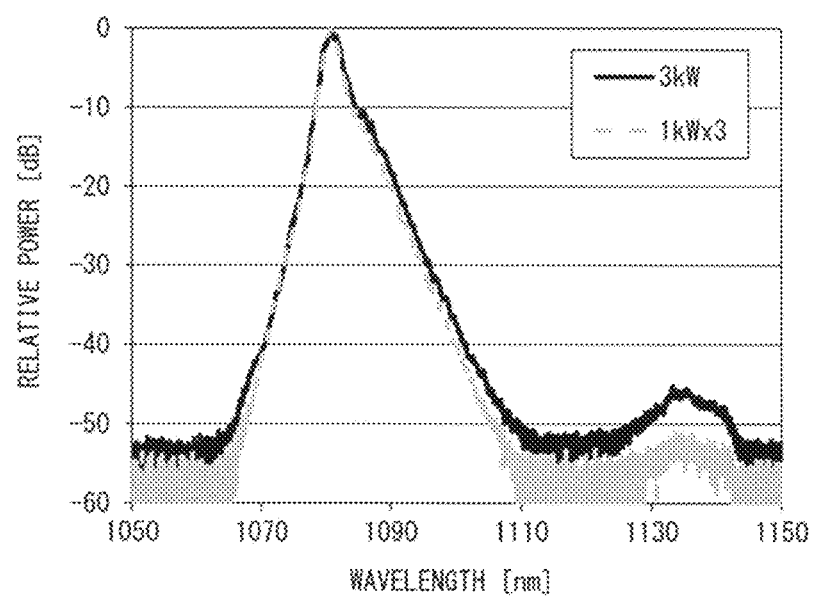
FIG. 4 is a graph comparing, at various wavelengths, (i) a value equivalent to three times the power of Stokes light generated by a fiber laser whose output power is 1 kW and (ii) the power of Stokes light generated by a fiber laser system having three (3) fiber lasers each of whose output power is 1 kW.

The following description will discuss an embodiment of the present invention with reference to FIGS. 1 through 3.

FIG. 1 schematically illustrates a configuration of a fiber laser system 1 in accordance with Embodiment 1 of the present invention. The fiber laser system 1 includes three (3) (a plurality of) fiber lasers 2 through 4, an output combiner (combiner) 5, a multi-mode fiber (output fiber) 6, an output section 7, and three (3) (a plurality of) optical fibers 10. The fiber laser system 1 processes a processing target object 8 by irradiating it with laser light. Examples of the processing target object 8 include steel materials (mild steel, carbon steel, stainless steel, etc.), non-ferrous materials (aluminum, copper, magnesium, etc.), brittle materials (ceramics, glass, etc.), and other types of materials (plastic, resin, etc.). Of the laser light with which the processing target object 8 is irradiated, approximately 5% to 10% is reflected by the processing target object 8, and in some cases, reflected light returns to the fiber laser system 1. The laser light which is reflected by the processing target object 8 and which returns to the fiber laser system 1 can adversely affect ideal operation of the fiber laser system 1.

The fiber lasers 2 through 4 each generate laser light and are each connected to the output combiner 5 by a respective one of the optical fibers 10. Each of the optical fibers 10, which are used to connect the fiber lasers 2 through 4 to the output combiner 5, is a single-mode or quasi-single-mode optical fiber. The fiber lasers 2 through 4 each employ an optical fiber, made of silica glass, as a laser medium. A configuration of each of the fiber lasers 2 through 4 will be later described in detail, with reference to FIG. 3.

The output combiner 5 serves to combine the laser light generated by each of the fiber lasers 2 through 4. Once combined, the laser light propagates as multi-mode light through the multi-mode fiber 6 and is then outputted from the output section 7 to outside the fiber laser system 1 (i.e., toward the processing target object 8).

Note that each of (i) the optical fibers of fiber lasers 2 through 4, (ii) the optical fibers 10, and (iii) the multi-mode fiber 6 is made from silica glass. These optical fibers generally have a light reflectance of approximately $10^{-5}$% per 1 m. Recursive amplification of Stokes light occurs due to (i) the aforementioned reflection of laser light by the processing target object 8 and (ii) reflection of light by these optical fibers. This amplification causes vibration to occur at the wavelength of the Stokes light resulting from SRS.

The fiber lasers 2 through 4 each have a lasing wavelength such that, for any given two of the fiber lasers 2 through 4, a difference between the respective lasing wavelengths thereof is greater than a wavelength equivalent to a half width at half maximum (hereinafter also referred to as "HWHM") of a peak of a Raman shift wavenumber spectrum for silica glass, the peak (described later) being deriving from a vibration mode of a planar four-membered ring. Specifically, each one of (i) the difference between the lasing wavelength $\lambda_{L2}$ of the fiber laser 2 and the lasing wavelength $\lambda_{L3}$ of the fiber laser 3, (ii) the difference between the lasing wavelength $\lambda_{L2}$ of the fiber laser 2 and the lasing wavelength $\lambda_{L4}$ of the fiber laser 4, and (iii) the difference between the lasing wavelength $\lambda_{L3}$ of the fiber laser 3 and the lasing wavelength $\lambda_{L4}$ of the fiber laser 4 is greater than a wavelength $\Delta\lambda_{SRS}$ equivalent to the abovementioned HWHM.

This makes it possible to ensure a sufficient difference between (i) the wavelength of the laser light from the fiber laser 2 and (ii) the wavelength of the laser light from the fiber laser 3. This also makes it possible to ensure a sufficient difference between (i) a peak wavelength $\lambda_{S2}$ of Stokes light originating from the laser light from the fiber laser 2 and (ii) a peak wavelength $\lambda_{S3}$ of Stokes light originating from the laser light from the fiber laser 3. As such, with respect to the peak wavelength deriving from the vibration mode of the planar four-membered ring, it becomes possible to increase the independence of SRS originating from the respective laser light outputted from each of fiber lasers 2 and 3. It is therefore possible, with respect to a peak wavelength deriving from the vibration mode of the planar four-membered ring, to reduce the efficiency of conversion of power from laser light to Stokes light (i.e., reduce Raman gain). As a result, it becomes possible to inhibit the generation of Stokes light at a peak wavelength deriving from the vibration mode of the planar four-membered ring. In other words, it is possible to inhibit the occurrence of vibration at the wavelength of Stokes light caused by SRS. Inhibiting this vibration refers to, in other words, (i) reducing the amount of power converted from the laser light of the fiber laser 3 to the Stokes light of the fiber laser 2 and also (ii) reducing the amount of power converted from the laser light of the fiber laser 2 to the Stokes light of the fiber laser 3. An effect similar to that seen when considering the fiber laser 2 and the fiber laser 3 with respect to each other is also brought about with regards to (i) the fiber laser 2 and the fiber laser 4 with respect to each other and (ii) the fiber laser 3 and the fiber laser 4 with respect to each other. This makes it possible to render Stokes light vibration less likely to occur throughout the entirety of the fiber laser system 1. It is therefore possible for the fiber laser system 1 to have a reflection resistance property superior to that of conventional techniques.

FIG. 2 is a graph showing a relation between (i) a wavenumber difference between laser light and Stokes light and (ii) an intensity of Stokes light, as seen in a case where laser light enters an optical fiber made of silica glass. FIG. 2 shows this relationship as seen when the fiber laser system 1 has a laser power $P_{AV}$ of 1.1 W, when the laser power $P_{AV}$ is 1.3 W, and when the laser power $P_{AV}$ is 1.5 W.

As is clear from the graph of FIG. 2, the Stokes light has (i) a peak in a case where the wavenumber difference between the laser light and the Stokes light is in the vicinity of 490 cm$^{-1}$, and (ii) a peak in a case where the wavenumber difference is in the vicinity of 440 cm$^{-1}$. The former is referred to as a peak deriving from the vibration mode of a planar four-membered ring of a Si—O network structure, whereas the latter is referred to as a peak deriving from a vibration mode of skeletal vibration of the Si—O network structure.

The following description discusses considerations on setting the lasing wavelength $\lambda_{L2}$ fiber laser 2 and the lasing wavelength $\lambda_{L3}$ of the fiber laser 3 so as to differ. In a case where Stokes light originating from the laser light of the fiber laser 2 has a peak wavelength $\lambda_{S2}$ of Stokes light that matches a peak wavelength $\lambda_{S3}$ of Stokes light originating from the laser light of the fiber laser 3, there could be a marked increase in the occurrence of Stokes light vibration in the fiber laser system 1.

In consideration of the above, Embodiment 1 has a configuration in which the difference between (i) the lasing wavelength $\lambda_{L2}$ of the fiber laser 2 and (ii) the lasing wavelength $\lambda_{L3}$ of the fiber laser 3 is greater than a wavelength equivalent to the HWHM of the peak deriving from the vibration mode of the planar four-membered ring of the Si—O network structure of silica glass. This makes it possible to ensure that the fiber laser 2 and the fiber laser 3 have respective peaks, deriving from the vibration mode of the planar four-membered ring, which peaks differ from each other sufficiently (by an amount greater than the HWHM of the peaks). The difference between the lasing wavelengths is preferably greater than a wavelength equivalent to the HWHM of a peak deriving from the vibration mode of the skeletal vibration of the Si—O network structure of the silica glass. This makes it possible to ensure that the fiber laser 2 and the fiber laser 3 have respective peaks, deriving from the vibration mode of the skeletal vibration, which peaks differ from each other sufficiently (by an amount greater than the HWHM of the peaks). This makes it possible to increase the independence of SRS originating from laser light outputted from each of the fiber lasers 2 and 3, thus making it possible to reduce the efficiency of conversion of power from laser light to Stokes light, which conversion is caused by SRS deriving from the vibration mode of the skeletal vibration. As a result, it is possible to render Stokes light vibration less likely to occur. Furthermore, it is preferable that one of the fiber lasers 2 and 3 has a peak wavenumber, of a peak deriving from the vibration mode of the planar four-membered ring, which peak wavenumber is less than a wavenumber obtained by subtracting (i) the HWHM of a peak of another one of the fiber lasers 2 and 3, which peak is deriving from the vibration mode of the skeletal vibration from (ii) a peak wavenumber of the peak of the another one of the fiber lasers 2 and 3, which peak is deriving from the vibration mode of the skeletal vibration. It is more preferable that one of the fiber lasers 2 and 3 has a peak wavenumber, of a peak deriving from the vibration mode of the skeletal vibration, which peak wavenumber is greater than a wavenumber obtained by adding (i) a peak wavenumber of a peak of another one of the fiber lasers 2 and 3, which peak is deriving from the vibration mode of the planar four-membered ring and (ii) the HWHM of the peak of the another one of the fiber lasers 2 and 3, which peak is deriving from the vibration mode of the planar four-membered ring. This makes it possible to ensure a sufficient difference between (i) a peak, of one of the fiber lasers 2 and 3, which peak is deriving from the vibration mode of the planar four-membered ring and (ii) a peak, of another one of the fiber lasers 2 and 3, which peak is deriving from the vibration mode of the skeletal vibration. This makes it possible to further increase the independence of SRS originating from laser light outputted from each of the fiber lasers 2 and 3, thus making it possible to further reduce the efficiency of conversion of power from laser light to Stokes light which conversion is caused by SRS deriving from the respective vibration modes. As a result, it is possible to render Stokes light vibration even less likely to occur.

The above can be rephrased as follows. The difference between the respective lasing wavelengths of the fiber lasers 2 and 3 is greater than a wavelength equivalent to a wavenumber obtained by A+B, or greater than a wavelength equivalent to a wavenumber obtained by A+C, where: A is a wavenumber obtained by subtracting (i) a peak wavenumber of a first peak, the first peak being (a) a peak of the fiber laser 3 and (b) a peak deriving from the vibration mode of the skeletal vibration from (ii) a peak wavenumber of a second peak, the second peak being (c) a peak of the fiber laser 3 and (d) a peak deriving from the vibration mode of the planar four-membered ring; B is a wavenumber equivalent to a HWHM of a third peak, the third peak being (e) a peak of the fiber laser 2 and (f) a peak deriving from the vibration mode of the skeletal vibration; and C is a wavenumber equivalent to a HWHM of a fourth peak, the fourth peak being (g) a peak of the fiber laser 2 and (h) a peak deriving from the vibration mode of the planar four-membered ring.

This makes it possible to ensure a difference between (i) the peak wavelength $\lambda_{S3}$ of Stokes light occurring from the laser light from the fiber laser 2 and (ii) the peak wavelength $\lambda_{S3}$ of Stokes light occurring from the laser light from the fiber laser 3. This makes it possible to sufficiently prevent the occurrence of Stokes light vibration in the fiber laser system 1.

Note that the above explanation made with reference to FIG. 2 also applies to (i) a difference between the lasing wavelength $\lambda_{L2}$ of the fiber laser 2 and a lasing wavelength $\lambda_{L4}$ of the fiber laser 4 and (ii) a difference between the lasing wavelength $\lambda_{L3}$ of the fiber laser 3 and the lasing wavelength $\lambda_{L4}$ of the fiber laser 4.

FIG. 3 is a diagram schematically illustrating a configuration of one of the fiber lasers (here, fiber laser 2) of the fiber laser system 1.

As shown in FIG. 3, the fiber laser 2 is connected to the output combiner 5 by one of the optical fibers 10, and includes a plurality of excitation light sources 21, a pump combiner 23, an amplifying optical fiber 25, a high reflection FBG (Fiber Bragg Grating) 24 functioning as a mirror, a low reflection FBG 26 functioning as a semi-transparent mirror.

The fiber laser 2 functions as a resonator-type fiber laser in which a section of the amplifying optical fiber 25, between the high reflection FBG 24 and the low reflection FBG 26, serves as a resonator. Each of the optical fibers, such as the amplifying optical fiber 25 and the optical fiber 10, has a core made of silica glass, and it is this core through which laser light propagates.

An optical fiber connecting the pump combiner 23 to the amplifying optical fiber 25 can have the same configuration as the amplifying optical fiber 25, provided that no active element has been added to the core of the optical fiber connecting the pump combiner 23 to the amplifying optical fiber 25.

The amplifying optical fiber 25 is a double cladding fiber whose core has an active element (for example, a rare earth element) added thereto. The high reflection FBG 24 is formed on one end of the amplifying optical fiber 25, while the low reflection FBG 26 is formed on another end of the amplifying optical fiber 25. The high reflection FBG 24 is configured to reflect laser light generated in the amplifying optical fiber 25. The high reflection FBG 24 has a reflectance, with respect to the laser light of the lasing wavelength, which reflectance is, for example, 99% or greater. The low reflection FBG 26 is configured to (i) reflect a portion of laser light generated in the amplifying optical fiber 25 and (ii) transmit the rest. The low reflection FBG 26 has a reflectance, with respect to the laser light of the lasing wavelength, which reflectance is lower than that of the high reflection FBG 24. The reflectance of the low reflection FBG 26 can be, for example, 10%. Each of the excitation light sources 21 supplies excitation light to the amplifying optical fiber 25 and is connected to the amplifying optical fiber 25 via the pump combiner 23.

In the fiber laser 2, excitation light from each of the excitation light sources 21 passes through the pump combiner 23 and enters a first cladding of the amplifying optical fiber 25. This excitation light is guided through the first cladding of the amplifying optical fiber 25, and, upon passing through the core, causes the active element added to the core to transition to a population inversion state. Once the active element is transitioned to the state of population inversion, it emits spontaneous emission light, and a chain of stimulated emission consequently occurs. The laser light emitted via stimulated emission is recursively amplified by being repeatedly reflected between the high reflection FBG 24 and the low reflection FBG 26.

Note that the fiber lasers 3 and 4 are configured in the same manner as the fiber laser 2 of FIG. 3.

Changing the lasing wavelength of the fiber laser 2 only requires changing a wavelength of light which the high reflection FBG 24 and the low reflection FBG 26 of the fiber laser 2 reflect. Similarly, changing the lasing wavelength of the fiber laser 3 only requires changing a wavelength of light which the high reflection FBG 24 and the low reflection FBG 26 of the fiber laser 3 reflect, and changing the lasing wavelength of the fiber laser 4 only requires changing the wavelength of light which the high reflection FBG 24 and the low reflection FBG 26 of the fiber laser 4 reflect.

The following description will discuss an example lasing wavelength for each of the fiber lasers 2 through 4 of the fiber laser system 1 of FIG. 1. The following description will discuss two examples (respectively referred to as Example 1 and Example 2).

Discussed first is Example 1. In Example 1, each of the fiber laser 2, the fiber laser 3, and the fiber laser 4 outputs laser light having an output power of 1 kW. That is, the fiber laser system 1 outputs laser light having an output power of 3 kW. The fiber laser 2, the fiber laser 3, and the fiber laser 4 have lasing wavelengths of 1078 nm (nanometers), 1080 nm, and 1082 nm, respectively. A wavelength equivalent to the HWHM of the peak deriving from the vibration mode of the planar four-membered ring of the Si—O network structure is less than approximately 2 nm. As such, the difference between the respective lasing wavelengths of any two of the fiber lasers 2 through 4 need only be not less than 2 nm.

Next is a discussion of Example 2. In Example 2, the output power of laser light outputted by each of fiber lasers 2 through 4, and the output power of laser light outputted by the fiber laser system 1 is the same as in Example 1. The fiber laser 2, the fiber laser 3, the fiber laser 4 have lasing wavelengths of 1060 nm, 1070 nm, and 1080 nm, respectively. A wavelength equivalent to the HWHM of the peak deriving from the vibration mode of the skeletal vibration of the Si—O network structure is less than approximately 10 nm. As such, the difference between the respective lasing wavelengths of any two of the fiber lasers 2 through 4 need only be not less than 10 nm.

A maximum value for the difference between each lasing wavelength is not particularly limited. Note that such a maximum value is determined as necessary in accordance with optical characteristics of the fiber laser system 1 (for example, an aberration property and a wavelength range of light amplifiable by each of the fiber lasers 2 through 4). Realistically, it is necessary that the peak wavelength of laser light from any one of the fiber lasers 2 through 4 does not match a peak wavelength of Stokes light originating from laser light from any other one of the fiber lasers 2 through 4. The risk of such a match can be adequately prevented by setting the difference between the respective lasing wavelengths of any given two of the fiber lasers 2 through 4 to be less than a wavelength equivalent to the Raman shift of silica glass, a specific example thereof being a wavelength less than 50 nm (approximately equivalent to 13 THz [terahertz]).

A fiber laser system in accordance with an aspect of the present invention is a fiber laser system including: a plurality of fiber lasers, each having a laser medium which is an optical fiber made from silica glass; a combiner for combining laser light outputted by each of the plurality of fiber lasers; and an output fiber, made from silica glass, through which laser light combined by the combiner propagates as multi-mode light, a difference between respective lasing wavelengths of any given two of the plurality of fiber lasers being greater than a wavelength equivalent to a half width at half maximum of a peak deriving from a vibration mode of a planar four-membered ring of an Si—O network structure of silica glass.

Silica glass has an Si—O network structure, and a Raman spectrum thereof includes (i) a peak deriving from a vibration mode of a planar four-membered ring of the Si—O network structure (peak wavenumber in the vicinity of 490 $cm^{-1}$: Kayser) and (ii) a peak deriving from a vibration mode of skeletal vibration of the Si—O network structure (peak wavenumber in the vicinity of 440 $cm^{-1}$) (see Japanese Patent Application Publication, Tokukaihei, No. 11-230830)

With the above configuration, it is possible to ensure a sufficient difference between (i) the wavelength of laser light from a first fiber laser (a first fiber laser of any given two) and (ii) the wavelength of laser light from a second fiber laser (a second fiber laser of the any given two). It is also possible to ensure a sufficient difference between (i) a peak wavelength of Stokes light originating from the laser light from the first fiber laser (the peak deriving from the vibration mode of the planar four-membered ring) and (ii) a peak wavelength of Stokes light originating from the laser light from the second fiber laser (the peak deriving from the vibration mode of the planar four-membered ring).

This makes it possible to increase the independence of SRS originating from laser light outputted from each of the fiber lasers, thus making it possible to reduce the efficiency of conversion of power from laser light to Stokes light (Raman gain) which conversion is caused by SRS deriving from the vibration mode of the planar four-membered ring. As a result, it is possible to render Stokes light vibration less likely to occur. The above configuration therefore enables the fiber laser system to have a reflection resistance property superior to that of conventional techniques.

A fiber laser system in accordance with another aspect of the present invention is configured such that the difference between the respective lasing wavelengths of any given two of the plurality of fiber lasers is greater than a wavelength equivalent to a half width at half maximum of a peak deriving from a vibration mode of a skeletal vibration of an Si—O network structure of silica glass.

The above configuration makes it possible to ensure a sufficient difference between (i) a peak wavelength of Stokes light originating from the laser light from a first fiber laser (the peak deriving from the vibration mode of the skeletal vibration) and (ii) a peak wavelength of Stokes light originating from the laser light from a second fiber laser (the peak deriving from the vibration mode of the skeletal vibration). This makes it possible to increase the independence of SRS originating from laser light outputted from each of the fiber lasers, thus making it possible to reduce the efficiency of conversion of power from laser light to Stokes light which conversion is caused by SRS deriving from the vibration mode of the skeletal vibration. As a result, it is possible to render Stokes light vibration less likely to occur. The above configuration therefore enables the fiber laser system to have an even more superior reflection resistance property.

A fiber laser system in accordance with another aspect of the present invention is configured such that the difference between the respective lasing wavelengths of any given two of the plurality of fiber lasers is greater than a wavelength equivalent to a wavenumber obtained by A+B, where: A is a wavenumber obtained by subtracting (i) a peak wavenumber of a first peak, the first peak being (a) a peak of a first fiber laser of the any given two and (b) a peak deriving from a vibration mode of a skeletal vibration of an Si—O network structure of silica glass, from (ii) a peak wavenumber of a second peak, the second peak being (c) a peak of the first fiber laser and (d) a peak deriving from the vibration mode of the planar four-membered ring, and B is a wavenumber equivalent to a half width at half maximum of a third peak, the third peak being (e) a peak of a second fiber laser of the any given two and (f) a peak deriving from the vibration mode of the skeletal vibration.

The above configuration makes it possible to ensure a sufficient difference between (i) a peak wavelength of Stokes light originating from the laser light from a first fiber laser (the peak deriving from the vibration mode of the skeletal vibration) and (ii) a peak wavelength of Stokes light originating from the laser light from a second fiber laser (the peak deriving from the vibration mode of the planar four-membered ring). This makes it possible, with respect to the above peak wavelengths, to further increase the independence of SRS originating from laser light outputted from each of the fiber lasers, thus making it possible to further reduce the efficiency of conversion of power from laser light to Stokes light which conversion is caused by SRS deriving from the respective vibration modes. As a result, it is possible to render Stokes light vibration even less likely to occur. The above configuration therefore enables the fiber laser system to have an even more superior reflection resistance property.

A fiber laser system in accordance with another aspect of the present invention is configured such that the difference between the respective lasing wavelengths of any given two of the plurality of fiber lasers is greater than a wavelength equivalent to a wavenumber obtained by A+C, where: A is a wavenumber obtained by subtracting (i) a peak wavenumber of a first peak, the first peak being (a) a peak of a first fiber laser of the any given two and (b) a peak deriving from the vibration mode of the skeletal vibration, from (ii) a peak wavenumber of a second peak, the second peak being (c) a peak of the first fiber laser and (d) a peak deriving from the vibration mode of the planar four-membered ring, and C is a wavenumber equivalent to a half width at half maximum of a third peak, the third peak being (e) a peak of a second fiber laser of the any given two and (f) a peak deriving from the vibration mode of the planar four-membered ring.

The above configuration makes it possible to ensure a sufficient difference between (i) a peak wavelength of Stokes light originating from the laser light from a first fiber laser (the peak deriving from the vibration mode of the planar four-membered ring) and (ii) a peak wavelength of Stokes light originating from the laser light from a second fiber laser (the peak deriving from the vibration mode of the skeletal vibration). This makes it possible to further increase the independence of SRS originating from laser light outputted from each of the fiber lasers, thus making it possible to further reduce the efficiency of conversion of power from laser light to Stokes light which conversion is caused by SRS deriving from the respective vibration modes. As a result, it is possible to render Stokes light vibration even less likely to occur. The above configuration therefore enables the fiber laser system to have an even more superior reflection resistance property.

A fiber laser system in accordance with another aspect of the present invention is configured such that the difference between the respective lasing wavelengths of any given two of the plurality of fiber lasers is less than a wavelength equivalent to a Raman shift of silica glass.

A fiber laser system in accordance with another aspect of the present invention is configured such that the output fiber is a multi-mode fiber.

The present invention is not limited to the embodiments, but can be altered by a skilled person in the art within the scope of the claims. An embodiment deriving from a proper combination of technical means each disclosed in a different embodiment is also encompassed in the technical scope of the present invention.

REFERENCE SIGNS LIST

1 Fiber laser system
2 Fiber laser
3 Fiber laser
4 Fiber laser
5 Output combiner (combiner)
6 Multi-mode fiber (output fiber)
7 Output section
8 Processing target object
10 Optical fiber
21 Excitation light sources
23 Pump combiner
24 High reflection FBG
25 Amplifying optical fiber
26 Low reflection FBG

The invention claimed is:

1. A fiber laser system comprising:
   a plurality of fiber lasers, each having a laser medium which is an optical fiber made from silica glass;
   a combiner for combining laser light outputted by each of the plurality of fiber lasers; and
   an output fiber, made from silica glass, through which laser light combined by the combiner propagates as multi-mode light,
   a difference between respective lasing wavelengths of any given two of the plurality of fiber lasers being greater than a wavelength equivalent to a half width at half maximum of a peak deriving from a vibration mode of a planar four-membered ring of an Si—O network structure of silica glass.

2. The fiber laser system as set forth in claim 1, wherein the difference between the respective lasing wavelengths of any given two of the plurality of fiber lasers is greater than a wavelength equivalent to a half width at half maximum of a peak deriving from a vibration mode of a skeletal vibration of an Si—O network structure of silica glass.

3. The fiber laser system as set forth in claim 1, wherein the difference between the respective lasing wavelengths of any given two of the plurality of fiber lasers is greater than a wavelength equivalent to a wavenumber obtained by A+B, where:
   A is a wavenumber obtained by subtracting (i) a peak wavenumber of a first peak, the first peak being (a) a peak of a first fiber laser of the any given two and (b) a peak deriving from a vibration mode of a skeletal vibration of an Si—O network structure of silica glass, from (ii) a peak wavenumber of a second peak, the second peak being (c) a peak of the first fiber laser and (d) a peak deriving from the vibration mode of the planar four-membered ring, and
   B is a wavenumber equivalent to a half width at half maximum of a third peak, the third peak being (e) a peak of a second fiber laser of the any given two and (f) a peak deriving from the vibration mode of the skeletal vibration.

4. The fiber laser system as set forth in claim 2, wherein the difference between the respective lasing wavelengths of any given two of the plurality of fiber lasers is greater than a wavelength equivalent to a wavenumber obtained by A+C, where:
   A is a wavenumber obtained by subtracting (i) a peak wavenumber of a first peak, the first peak being (a) a peak of a first fiber laser of the any given two and (b) a peak deriving from the vibration mode of the skeletal vibration, from (ii) a peak wavenumber of a second peak, the second peak being (c) a peak of the first fiber laser and (d) a peak deriving from the vibration mode of the planar four-membered ring, and
   C is a wavenumber equivalent to a half width at half maximum of a third peak, the third peak being (e) a peak of a second fiber laser of the any given two and (f) a peak deriving from the vibration mode of the planar four-membered ring.

5. The fiber laser system as set forth in claim 1, wherein the difference between the respective lasing wavelengths of any given two of the plurality of fiber lasers is less than a wavelength equivalent to a Raman shift of silica glass.

6. The fiber laser system as set forth in claim 1, wherein the output fiber is a multi-mode fiber.

\* \* \* \* \*